United States Patent
Endo et al.

(10) Patent No.: US 7,647,302 B2
(45) Date of Patent: Jan. 12, 2010

(54) METHOD FOR SEARCHING LAYERED DATA

(75) Inventors: Rich Endo, Los Angeles, CA (US); David Brookler, Los Angeles, CA (US); David Sullivan, Cahoga Park, CA (US)

(73) Assignee: SAP, AG, Walldorf (DE)

( * ) Notice: Subject to any disclaimer, the term of this patent is extended or adjusted under 35 U.S.C. 154(b) by 255 days.

(21) Appl. No.: 11/217,068

(22) Filed: Aug. 31, 2005

(65) Prior Publication Data

US 2006/0271956 A1 Nov. 30, 2006

Related U.S. Application Data

(63) Continuation-in-part of application No. 11/142,005, filed on May 31, 2005.

(51) Int. Cl.
*G06F 17/30* (2006.01)

(52) U.S. Cl. .......................................... 707/3; 707/101

(58) Field of Classification Search ...................... None
See application file for complete search history.

(56) References Cited

U.S. PATENT DOCUMENTS

| | | | |
|---|---|---|---|
| 6,198,906 B1 | 3/2001 | Boetje | |
| 6,345,256 B1 * | 2/2002 | Milsted et al. .................. | 705/1 |
| 6,411,992 B1 | 6/2002 | Srinivasan | |
| 6,463,206 B1 | 10/2002 | Yuen | |
| 6,463,585 B1 | 10/2002 | Hendricks | |
| 6,477,185 B1 | 11/2002 | Komi | |
| 6,532,442 B1 | 3/2003 | Schumacher | |
| 6,574,630 B1 * | 6/2003 | Augustine et al. ............. | 707/10 |
| 6,697,103 B1 * | 2/2004 | Fernandez et al. .......... | 348/143 |
| 6,824,044 B1 * | 11/2004 | Lapstun et al. .............. | 235/375 |
| 6,987,868 B1 * | 1/2006 | Atarashi et al. ............. | 382/112 |
| 7,006,881 B1 * | 2/2006 | Hoffberg et al. .............. | 700/83 |
| 7,017,162 B2 * | 3/2006 | Smith et al. .................. | 719/328 |
| 7,070,392 B2 | 7/2006 | Bradbury et al. | |
| 7,117,504 B2 * | 10/2006 | Smith et al. .................. | 719/328 |
| 7,165,239 B2 * | 1/2007 | Hejlsberg et al. ........... | 717/114 |
| 7,181,417 B1 * | 2/2007 | Langseth et al. .............. | 705/26 |
| 2001/0029613 A1 * | 10/2001 | Fernandez et al. .......... | 725/105 |
| 2002/0077941 A1 * | 6/2002 | Halligan et al. ............... | 705/30 |
| 2002/0107951 A1 * | 8/2002 | Teague et al. ............... | 709/223 |

(Continued)

OTHER PUBLICATIONS

Resnick et al., "PICS: Internet Access Controls Without Censorship", Oct. 1996, Communications of the ACM, vol. 39, No. 10, p. 87-93.*

(Continued)

*Primary Examiner*—Khanh B Pham
(74) *Attorney, Agent, or Firm*—Dalina Law Group, P.C.

(57) ABSTRACT

Enables search and test for at least one value in layers of audience specific data comprising language, regional, regulatory and/or cultural specific values per layer. The word "audience" for the purposes of this specification means a group of document consumers such as people or computers that are associated with a language, country, region, regulation, culture or any other user defined division. A search utilizing at least one embodiment of the invention occurs with respect to data that makes use of rule-based inheritance. Testing multiple audience layers for all values that meet a specific fine or coarse grained search criteria allows quality assurance testing across all target audiences for a document before publication.

8 Claims, 10 Drawing Sheets

U.S. PATENT DOCUMENTS

| | | | |
|---|---|---|---|
| 2002/0152288 A1* | 10/2002 | Hora et al. | 709/219 |
| 2003/0033174 A1 | 2/2003 | Ikeda | |
| 2003/0084059 A1* | 5/2003 | Kelley et al. | 707/102 |
| 2003/0084379 A1* | 5/2003 | Bingham et al. | 714/38 |
| 2003/0115585 A1* | 6/2003 | Barsness et al. | 725/9 |
| 2004/0162812 A1 | 8/2004 | Lane | |
| 2004/0267595 A1* | 12/2004 | Woodings et al. | 705/9 |
| 2005/0045712 A1* | 3/2005 | Paul et al. | 235/375 |
| 2005/0066172 A1* | 3/2005 | Vorbruggen et al. | 705/1 |
| 2005/0171661 A1* | 8/2005 | Abdel-Malek et al. | 701/33 |
| 2005/0203884 A1* | 9/2005 | Allen et al. | 707/3 |
| 2006/0106825 A1* | 5/2006 | Cozzi | 707/100 |
| 2006/0268107 A1* | 11/2006 | Weinberg et al. | 348/143 |
| 2006/0271523 A1 | 11/2006 | Brookler | |
| 2006/0271868 A1* | 11/2006 | Sullivan et al. | 715/764 |
| 2006/0271956 A1 | 11/2006 | Endo | |
| 2006/0271957 A1* | 11/2006 | Sullivan et al. | 725/46 |
| 2006/0288265 A1* | 12/2006 | Brookler | 715/500 |
| 2007/0186241 A1* | 8/2007 | Sugimoto et al. | 725/46 |
| 2007/0226493 A1* | 9/2007 | O'Brien et al. | 726/27 |

OTHER PUBLICATIONS

Kang et al, "Design and Assurance Strategy for the NRL Pump", Apr. 1998, IEEE Computer, p. 56-63, <Retrieved from IEEE Xplore Dec. 29, 2008>.*

Norton, "Language, Identity, and the Ownership of English", Oct. 1997, TESOL Quarterly, vol. 31, No. 3, p. 409-429, <Retrieved from UBC.ca May 25, 2009>.*

Silva et al, "Family Matters: The Influence of Applied Linguistics and Composition Studies on Second Language Writing Studies—Past, Present, and Future", Jan 2004, The Modern Language Journal, vol. 88. No. i, p. 1-13, <Rescanned from internet PDF May 26, 2009>.*

Agnihotri, Multimedia Summarization and Personalization of Structured Video, Feb. 2005, Doctoral Dissertation, Columbia University, p. 1-242.

Babaguchi et al., "Generation of Personalized Abstract of Sports Video", Aug. 2001, ICME 2001, IEEE Press, p. 800-803.

Buczak et al., "Personalization: Improving Ease-of Use, Trust, and Accuracy of a TV Show Recommender", May 2002, IEEE, Proceedings of TV 2002, p. 1-10.

Brassil, "Structuring Internet Media Streams with Cueing Protocols", Aug. 2002, IEEE/ACM Transactions on Networking, p. 466-476.

Hjelsvold et al. "Web-based Personalization and Management of Interactive Video", May 2001, ACM WWW10, p. 129-139.

Yasugi et al., "Detection of Identical Events from Broadcasted Sports Video by Comparing Camera Works", Oct. 2001, ACM MIR 2001, p. 66-69.

Zimmerman, "TV Personalization System: Design of a TV Show Recommender Engine and Interface", Nov. 2004, p. 27-51.

* cited by examiner

Figure 1

MAIN DATA TABLE

| PRODUCT_ID | NAME_ID | DESCRIPTION_ID | ... | ACCESSORY | WEIGHT |
|---|---|---|---|---|---|
| 220304 | 17 | 334 | ... | | 1.2 |
| 220305 | 22 | 427 | ... | 29;47 | 0.6 |

Figure 2

DATA ATTRIBUTE TABLE

| NAME_ID | AUDIENCE_ID | NAME | ... |
|---|---|---|---|
| 17 | 0 | tennis sweater | ... |
| 17 | 1 | tennis jumper | ... |
| 22 | 0 | tennis ball | ... |
| 29 | 0 | ball bag | ... |
| 47 | 0 | ball basket | ... |

Figure 3

AUDIENCE ORDER TABLE

| audience_ID | audience_order | position | alive |
|---|---|---|---|
| 0 | 0;1;4;#;3;2 | 0 | TRUE |
| 1 | 1;0;#;4 | 1 | TRUE |
| 2 | 2 | 2 | FALSE |
| 3 | 3;0;1;2 | 3 | TRUE |
| 4 | 0;4;#;1 | 0 | TRUE |
| ... | ... | ... | |

Figure 4

AUDIENCE TABLE

| audience_ID | language | country | region | name | ... |
|---|---|---|---|---|---|
| 0 | eng | USA | whole | English US | ... |
| 1 | eng | AUS | whole | English Australia | ... |
| 2 | esp | MEX | whole | Spanish Mexico | ... |
| 3 | eng | USA | California | English Calif | ... |
| 4 | eng | CAN | whole | English CAN | |

Figure 5

Coarse grained IS NULL and IS NOT NULL Operators versus Field Type

| Operator v. Field Type | Returns TRUE based on field type | | |
| --- | --- | --- | --- |
| | Non-Lookup Field | Lookup Field | Multi-Value Lookup |
| IS NOT NULL | Returns TRUE if there is a value in any layer for this field | Returns TRUE if there is a link in any layer for this field | Returns TRUE if there is a link in any layer for this field |
| IS NULL | Returns TRUE if there are no values in any layer for this field | Returns TRUE if there are no links in any layer for this field | Returns TRUE if there are no links in any layer for this field |

Figure 6

Value or link locations with Audience Inheritance

| Case | Current Layer | Primary Inherited | Secondary Inherited |
|------|---------------|-------------------|---------------------|
| 0    |               |                   |                     |
| 1    |               |                   | •                   |
| 2    |               | •                 |                     |
| 3    |               | •                 | •                   |
| 4    | •             |                   |                     |
| 5    | •             |                   | •                   |
| 6    | •             | •                 |                     |
| 7    | •             | •                 | •                   |

A bullet (•) means there is a value in a non-lookup field, or a link in a lookup field, or a link in a multi-value lookup field in the corresponding audience layer.

Figure 7

The Fine Grained Audience Layer Operators versus the location of a value or link.

| Audience Layer Operator versus location of value or link | Location of value for Non-Lookup Field, or link for Lookup Field or link for Multi-Valued Lookup Field as per the cases detailed in Figure 2 | | | | | | | |
|---|---|---|---|---|---|---|---|---|
| | 0 | 1 | 2 | 3 | 4 | 5 | 6 | 7 |
| HAS VALUE | | | | | • | • | • | • |
| IS MISSING VALUE | • | • | • | • | | | | |
| INHERITS PRIMARY | | | • | • | | | | |
| INHERITS SECONDARY | | • | | | | | | |
| INHERITS ANY | | • | • | • | | | | |
| DOES NOT INHERIT | • | | | | • | • | • | • |

A bullet (•) means that the audience operator returns a TRUE test result.

METHOD FOR SEARCHING LAYERED DATA

This application is a continuation in part of U.S. patent application Ser. No. 11/142,005, filed May 31, 2005 entitled "METHOD FOR TESTING LAYERED DATA FOR THE EXISTENCE OF AT LEAST ONE VALUE" which is hereby incorporated herein by reference.

BACKGROUND OF THE INVENTION

1. Field of the Invention

Embodiments of the invention described herein pertain to the field of computer systems. More particularly, but not by way of limitation, one or more embodiments of the invention enable a user to search hierarchically layered audience specific data comprising language, regional, regulatory and/or cultural specific divisions.

2. Description of the Related Art

Known systems store data associated with multiple languages using techniques that are memory and labor intensive. These systems do not take advantage of values that are identical in across languages and do not allow for inheriting values and searching values within separate localizations. Internationalization efforts to date allow for language, country and locale variations, but do not allow for further subdivisions based on regional, regulatory, cultural variations or any user desired subdivision. When searching for a value using these systems, each independent data set must be searched in order to find a value existing in a particular localization.

Known systems do not allow for a subdivision of labor that allow certain workers to perform layered data entry and other workers to perform searching and testing for missing values or inherited values.

For at least the limitations described above there is a need for a system that quickly enables a user to search and test layers of audience specific data comprising language, regional, regulatory and/or cultural specific values per layer.

SUMMARY OF THE INVENTION

One or more embodiments of the invention enable a user to search layered data comprising audience specific data having language, regional, regulatory and/or cultural specific values. The word "audience" for the purposes of this specification means a group of document consumers such as people or computers that are associated with a language, country, region, regulation or culture or any other user defined division. Audience specific data therefore is data targeted at a specific audience. A search utilizing at least one embodiment of the invention makes use of rule-based inheritance in finding values in layers that comprise audience specific data and allows for workers to switch the inheritance order or alter data in particular inheritance layers to ensure that a final document is correctly populated.

Initial creation of a multi-audience document comprises setting up an audience inheritance hierarchy and entry and edit of data for each desired audience. The audience hierarchy may be implemented as a tree or linear structure or any other structure allowing for one audience to specify another audience in which to inherit data from. For example when obtaining a data value for a particular audience, if that value does not exist for that audience then the audience hierarchy may be utilized to find the data value for an inherited audience. A data value may exist in the main data table or a data attribute table in the case of a lookup value as will be explained below. By adding regional, cultural or regulatory or other subdivisions within the audience hierarchy and inheriting large portions of existing audience specific data entries, a large number of audience specific documents may be generated with a minimal amount of data entry required. Use of an audience hierarchy eliminates redundant data entry, minimizes the maintenance required to support the data and allows for rapid addition of audiences to be utilized in generating a particular document. Updating information for multiple audiences occurs automatically without the need to update all entries for a given hierarchy since inherited values are automatically available to audiences in the same hierarchy. The main data table is not required to be altered when adding an audience, as an audience is defined in the audience table and lookup values may be added for an audience to the data attribute table. Audiences may be specified in a given order for traversal within the hierarchy and used in order to display data with visual characteristics to inform a user if the value for a particular piece of data is being used from the current layer or is inherited.

Data may also be imported into the system and associated with a particular layer. After importing data, the data may be searched and tested. When importing data, the import can be directed to a particular audience layer by querying the user, or obtaining an associated audience identifier from the user or from a computer in any convenient manner. In this manner the supported audiences may be built up from external programs or data sources and independently entered into the system. Exporting data may comprise exporting a particular audience layer or exporting all audience layers. Import and export may make use of existing file formats and applications from various software manufacturers.

Searching and testing multi-layered data occurs with respect to desired audience identifiers once the audience hierarchy is set up and data has been entered or imported or otherwise exists for a plurality of audiences. An audience identifier for testing may be entered manually or a default value may be obtained automatically from the computer associated with a user for example. An audience identifier may specify the language, or the language and country, or the language, country and region, or the language, region and culture, or the culture and regulatory area or any other combination of audience identifying values. A document targeted at a particular audience that also may inherit values from other audiences may be searched and tested at any time after data has been entered into the system and before or after the data is edited. Specifying a current audience identifier on which to test an audience specific document allows for the proper hierarchy to be used in the search as per the inheritance hierarchy defined for each audience comprising data in the repository. A worker involved with testing a document may utilize any type of user input to switch the current audience identifier or to allow for searching on all audience identifiers sequentially to ensure that all target documents for all audiences are tested.

Initial entry of data specific to an audience may comprise adding a very small amount of data if the audience may be based extensively on another audience. For example if one region of a given country does not allow a particular picture or word to be used for a given document, then that region may be defined as a separate audience that uses all of the data of an inherited audience except for the word or picture that is not allowed. If a particular color is undesirable for display in a given culture, then that color may be altered just for that culture. The actual addition of the data specifying the audience itself comprises a small amount of data and defines the hierarchy to traverse when a data entry is not found for a particular audience. By viewing the data and the associated color or other visual representation associated with an audience, the minimal amount of data entries may be made to take advantage of other existing audience data. One embodiment of the invention utilizes three layers of inheritance called the current, primary and secondary inheritance layer levels. The visual representation may involve the color black for the current layer, green for the primary inheritance layer and red for the secondary inheritance layer. In this case, when viewing the data under a current audience setting, text that is inherited from a first inherited audience may be green, and text for an audience that uses a secondary inheritance audience may be red. Pictures that are inherited may be surrounded by a black, green or red border to depict their inheritance level for example. Any other method of visually displaying the different levels of inheritance is in keeping with the spirit of the invention such as for example showing the current audience layer in bold type, the primary inheritance audience layer in regular type and the secondary inheritance audience layer in italic. For workers involved in testing an audience layered document, an interface comprising a list of layers with values failing a test on a layer by layer basis may be utilized.

There are at least three types of fields used with embodiments of the invention, non-lookup fields, lookup fields and multi-value lookup fields. Non-lookup fields are traditional fields that have a value in a field. Lookup fields comprise a link to another table that specifies a value in the second table. Multi-value lookup fields may comprise more than one link to another table or alternatively may comprise a link identifier to a number of fields in another table. Multi-value lookup fields that comprise more than one link per field are shown herein with semicolons separating the multiple links in a given field. One skilled in the art will readily appreciate that any method of indirectly associating multiple values with one field is in keeping with the spirit of the invention.

Values may be searched for NULL or non-NULL entries for all layers at once or on a fine grained level. When searching for NULL entries, values or links to values are tested depending on the type of the field. For fields of type non-lookup, values themselves are checked. For fields of type lookup or multi-value lookup, the links themselves are tested. To determine if a value pointed at by a link is null, the sub-table itself may be tested for NULL values that are referenced by a given link. In practice, however, with a multi-audience repository and audience inheritance, the "IS NULL" operator may not always be granular enough, since it does not distinguish between the various cases of missing data such as data missing entirely from all layers, missing from the current layer but inherited from some other layer, and so on.

To deal with these different cases of data locations with audience inheritance, the system may utilize audience layer operators that allow for searching and testing data with fine grained granularity in specified layers. For lookup fields, the audience layer operator used in a search returns true for fields that have a link to a given lookup value. For multi-value lookup fields, the audience layer operator used in a search returns true for fields that have at least one link to a given lookup value. In multi-audience data sets, searching for the existence of data using the coarse grained "IS NULL" operator returns non-lookup fields that have all associated audience inheritance levels set to NULL or lookup fields that do not link to a sub-table. The fine grained "HAS VALUE" operator checks for missing data in the current audience layer only as opposed to checking in all layers as the coarse grained "IS NULL" operator does. Other predefined audience layer operators may also be used for fine grain searching such as "HAS VALUE", "IS MISSING VALUE", "INHERITS PRIMARY", "INHERITS SECONDARY", "INHERITS ANY", "DOES NOT INHERIT". "HAS VALUE" and "IS MISSING VALUE" are complementary functions used to determine if the current audience layer comprises a value or whether the converse is true. For lookup fields these functions are used in order to check for values or missing values across the set of all links. "INHERITS PRIMARY" returns a match when the current audience layer inherits a value from either the primary or secondary audience layer and "INHERITS SECONDARY" returns a match when the current audience layer inherits from only the secondary audience layer, while "INHERITS ANY" returns a match when either of the previous two cases is true. "DOES NOT INHERIT" returns a match when there is a current audience layer value for non-lookup fields or when all layers are null. A worker involved with testing may test for "INHERITS PRIMARY" across all audiences for example, or may test a particular layer in order to view the results of the test.

DETAILED DESCRIPTION OF THE INVENTION

A method for searching layered data will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
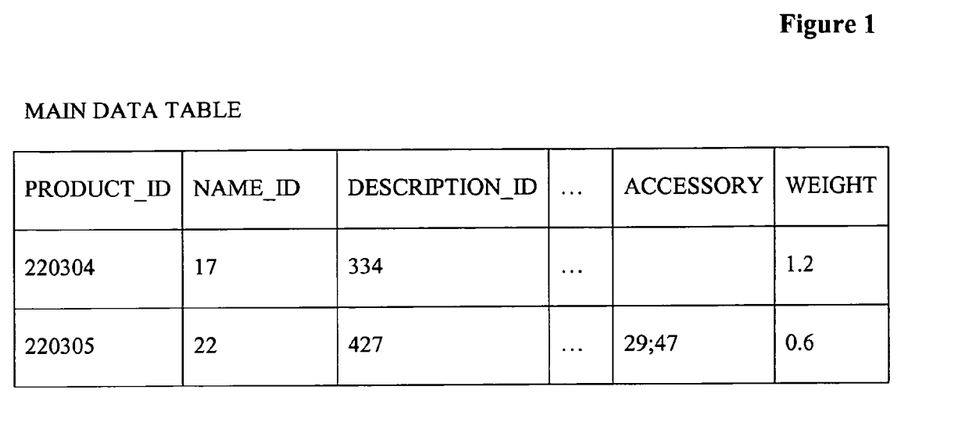
FIG. 1 illustrates a main data table used in conjunction with one or more embodiments of the invention.
Figure 2:
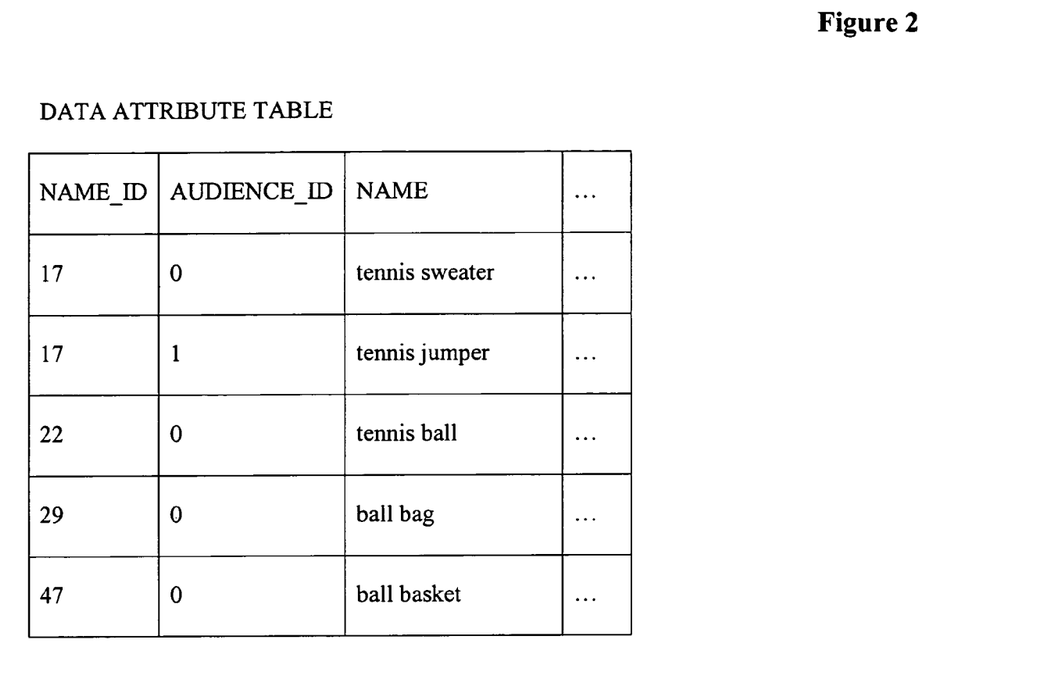
FIG. 2 illustrates a data attribute table used in conjunction with one or more embodiments of the invention.
Figure 3:
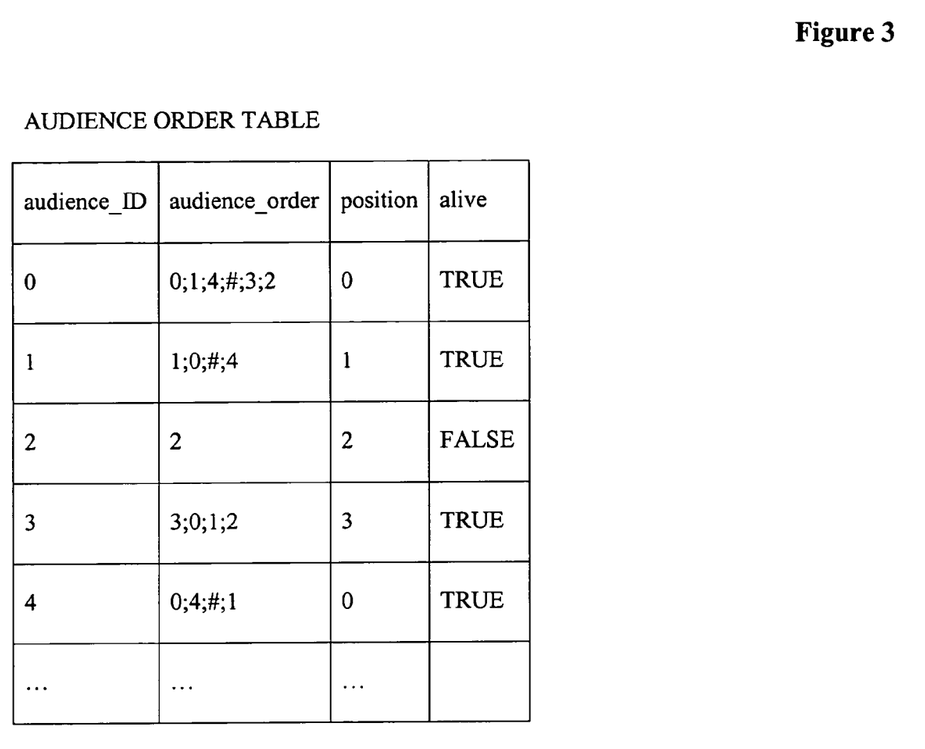
FIG. 3 illustrates an audience order table used in conjunction with one or more embodiments of the invention.

Initial creation of a multi-audience document comprises setting up an audience inheritance hierarchy and entry and edit of data for each desired audience. The audience hierarchy may be implemented as a tree or linear structure or any other structure allowing for one audience to specify another audience in which to inherit data from. For example when obtaining a data value for a particular audience, if that value does not exist for that audience then the audience hierarchy may be utilized to find the data value for an inherited audience. A data value may exist in the main data table in the case of a non-lookup value or a data value may exist in a data attribute table in the case of a lookup value that is indirectly referenced via a link as will be explained below. FIG. 1 shows a main data table comprising products for example. The name of a product in this example is entered into another table namely the data attribute table shown in FIG. 2. For each audience that has a unique value for the given data attribute, an entry in the data attribute table may be created. For example product number 220304 shown in the main data table comprises an audience specific name that is a lookup value that is obtained from the data attribute table when generating a document. Specifically, NAME_ID 17 is obtained from the data attribute table for a desired audience identifier. In this case if the audience identifier is 0 then the name "tennis sweater" is obtained. If the audience identifier is 1 then the-name "tennis jumper" is obtained. For example when obtaining a data value for a particular audience, if that value does not exist for that audience then the audience hierarchy may be utilized to find the data value for an inherited audience. In this case, if audience 1 is used in obtaining the name of product 220305, then reference name identifier 22 is used to look up the actual product name in the data attribute table. Since there is no name identifier and audience identifier combination that yields a name (no NAME_ID 17 and AUDIENCE_ID 1 entry exists in the data attribute table), then the audience order table shown in FIG. 3 is referenced in order to obtain the next audience identifier to use in finding a suitable value via inheritance. Since the next value in the audience order field for audience 1 is 0, then audience 0 is used in looking up the value next in the data attribute table. In this way, only one entry for a given data entry is required since multiple audiences can share the value. In other words, the value "tennis ball" is obtained since the NAME_ID 22 and AUDIENCE_ID 0 is used to obtain this inherited value. In FIG. 1, the ACCESSORY field shows a NULL value for PRODUCT_ID 220304 and a value of "29;47" for PRODUCT_ID 220305. The "29; 47" entry is a multi-value lookup field that specifies two links to the data attribute table. The WEIGHT column shows entries that are local to the main data table and are not obtained via a lookup using the data attribute table.

Figure 4:
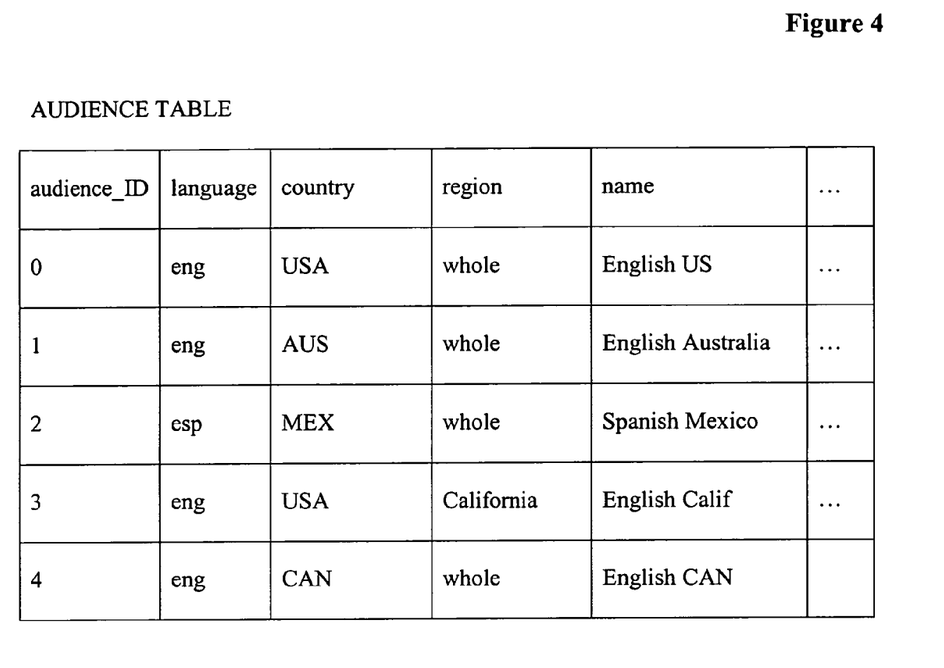
FIG. 4 illustrates an audience table used in conjunction with one or more embodiments of the invention.

By adding regional, cultural or regulatory subdivisions within the audience hierarchy and inheriting large portions of existing audience specific data entries, a large number of audience specific documents may be generated with a minimal amount of data entry required. In the example shown in FIG. 2, if there a thousand separate entries related to tennis and only a few of the items differ in name between audiences, then the second audience addition comes at very little expenditure of labor in entering the data that differs. For example, audience 1 corresponding to English Australia in the audience table shown in FIG. 4 may be added taking advantage of nearly all of the entries of the English US audience. In addition, setting up a corresponding audience order entry in the audience order table shown in FIG. 3 allows for the traversal of audiences in a hierarchical manner in order to obtain or search for values or the existence of values. For this example, audience 1 specifies that it first utilize its own audience identifier 1 in obtaining or searching for data, followed by audience identifier 0. The semicolon specifies a stop flag that denotes that any data found lower (to the right) in the hierarchy should not be published, but may be shown on the user interface to aid in the publication of a multi-audience document. Any other data layout allowing for traversal of hierarchies is in keeping with the spirit of the invention.

There are at least three types of fields used with embodiments of the invention, non-lookup fields, lookup fields and multi-value lookup fields. Non-lookup fields are traditional fields that have a value in a field such as the WEIGHT field shown in FIG. 1. Lookup fields comprise a link to another table that specifies a value in the second table such as the NAME_ID field shown in FIG. 1. Multi-value lookup fields may comprise more than one link to another table or alternatively may comprise a link identifier to a number of fields in another table such as the ACCESSORY field shown in FIG. 1. Although multi-value lookup fields that comprise more than one link per field are shown herein with semicolons separating the multiple links in a given field. One skilled in the art will readily appreciate that any method of indirectly associating multiple values with one field is in keeping with the spirit of the invention. Although the example tables shown comprise one level of indirection, the data attribute table may comprise a link to a lookup table for lookup values and a text or numerical entry for a non-lookup value thereby removing non-lookup values from the main data table and providing another level of indirection. Any level of indirection is in keeping with the spirit of the invention.

Use of an audience hierarchy eliminates redundant data entry, minimizes the maintenance required to support the data and allows for rapid addition of audiences to be utilized in generating a particular document. Updating information for multiple audiences occurs automatically without the need to update all entries for a given hierarchy since inherited values are automatically available to audiences in the same hierarchy. For example, updating the name of a non-lookup value, lookup value or multi-value lookup is automatically available to any audience inheriting values from a given audience. The main data table is not required to be altered when adding an audience, as an audience is defined in the audience table and lookup values may be added for an audience to the data attribute table. Audiences may be specified in a given order for traversal within the hierarchy and used in order to display data with visual characteristics to inform a user if the value for a particular piece of data is being used from the current layer or is inherited. For example as shown in FIG. 2, by adding any value such as was done for name identifier 22, that value is available to all audiences that comprise the audience 0 in their inheritance chain as shown in FIG. 3. The main data table shown in FIG. 1 is not required to be altered for all audiences, instead attributes are added or modified in the main data table or in the data attribute table shown in FIG. 2 and are automatically available to audiences that inherit these values.

Data may also be imported into the system and associated with a particular layer. After importing data, the data may be searched. When importing data, the import can be directed to a particular audience layer by querying the user, or obtaining an associated audience identifier from the user or from a computer in any convenient manner. In this manner the supported audiences may be built up from external programs or data sources and independently entered into the system. Exporting data may comprise exporting a particular audience layer or exporting all audience layers. Import and export may make use of existing file formats and applications from various software manufacturers.

Searching and testing multi-layered data occurs with respect to at least one audience identifier or current audience identifier after the audience hierarchy is set up and data has been entered or imported or otherwise exists for a plurality of audiences as per FIGS. 1-4. The audience identifier(s) for searching and testing may be entered manually or automatically from the user or computer associated with a user. The audience identifier may specify the language, or the language and country, or the language, country and region, or the language, region and culture, or the culture and regulatory area or any other combination of audience identifying values. Specifying the current audience identifier or multiple audience identifiers allows for the proper hierarchy to be used in the search as per the inheritance hierarchy defined for each audience as per the audience order shown in FIG. 3.

Initial entry of data specific to an audience may comprise adding a very small amount of data if the audience may be based extensively on another audience. For example if one region of a given country does not allow a particular picture or word to be used for a given document, then that region may be defined as a separate audience that uses all of the data of an inherited audience except for the word or picture that is not allowed. If a particular color is undesirable for display in a given culture, then that color may be altered just for that culture. The actual addition of the data specifying the audience itself comprises a small amount of data and defines the hierarchy to traverse when a data entry is not found for a particular audience. By viewing the data and the associated color or other visual representation associated with an audience, the minimal amount of data entries may be made to take advantage of other existing audience data. One embodiment of the invention utilizes three layers of inheritance called the current, primary and secondary inheritance layer levels. The visual representation may involve the color black for the current layer, green for the primary inheritance layer and red for the secondary inheritance layer. In this case, when viewing the data under a current audience setting, text that is inherited from a first inherited audience may be green, and text for an audience that uses a secondary inheritance audience may be red. Pictures that are inherited may be surrounded by a black, green or red border to depict their inheritance level for example. Any other method of visually displaying the different levels of inheritance is in keeping with the spirit of the invention such as for example showing the current audience layer in bold type, the primary inheritance audience layer in regular type and the secondary inheritance audience layer in italic. One or more embodiments of the invention use multiple inheritance levels separated by a stop flag shown in FIG. 3 as an asterisk separating inheritance levels that are capable of being used for publication versus inheritance levels that are only used for obtaining data for the user interface.

Figure 5:
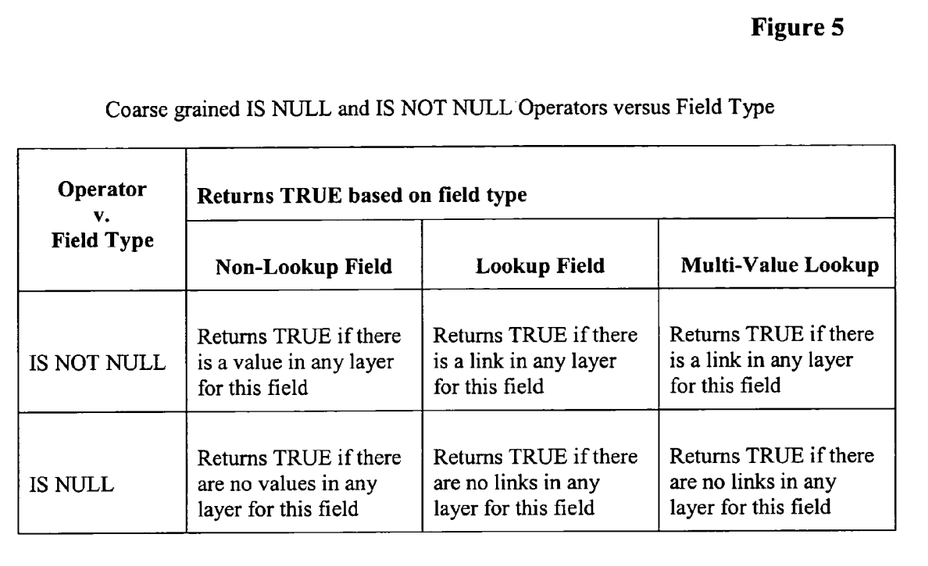
FIG. 5 illustrates the coarse grained IS NULL and IS NOT NULL Operators versus Field Type.

Values may be searched for NULL or non-NULL entries for all layers at once or on a fine grained level. When searching for NULL entries, values or links to values are tested depending on the type of the field. For fields of type non-lookup, values themselves are checked. For fields of type lookup or multi-value lookup, the links themselves are tested. To determine if a value pointed at by a link is null, the sub-table itself may be tested for NULL values that are referenced by a given link. In practice, however, with a multi-audience repository and audience inheritance, the "IS NULL" operator may not always be granular enough, since it does not distinguish between the various cases of missing data such as data missing entirely from all layers, missing from the current layer but inherited from some other layer, and so on. For example, if the current audience identifier is 1, then for a lookup or multi-value lookup field, the audiences with identifiers 1, 0 and 4 are checked as per the second row of the audience order table shown in FIG. 3 in combination with the NAME_ID for a particular name via the data attribute table. For example, if there is any value with a NAME_ID of 17 and an audience identifier of 1, 0 or 4, then a value exists and "IS NOT NULL" returns TRUE. FIG. 5 shows the possible outcomes for searching using the coarse grain operators "IS NULL" and "IS NOT NULL".

Figure 6:
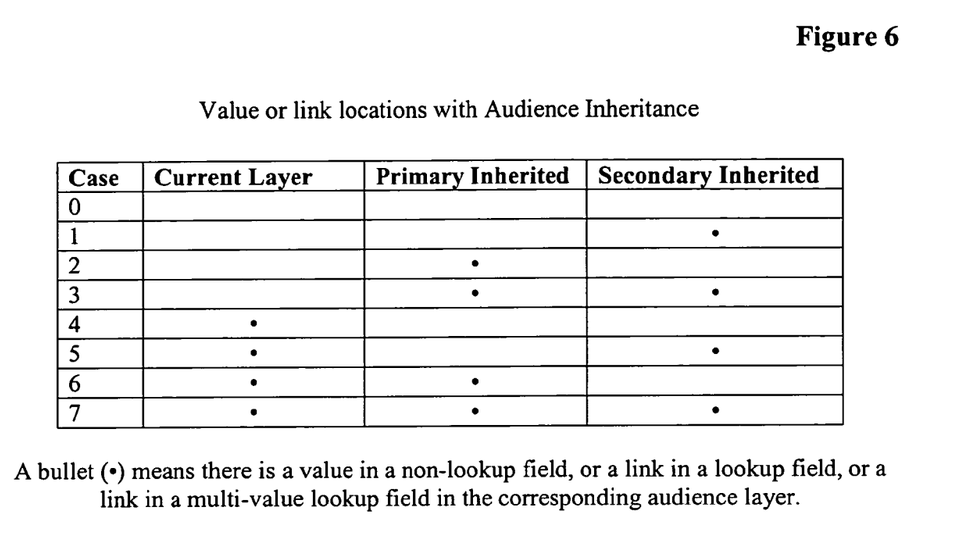
FIG. 6 illustrates the value or link locations within the Audience Inheritance.

FIG. 6 shows value or link location cases for a three level inheritance embodiment. For example, if a value or link exists in a particular layer, a bullet is shown in the respective cell. Again, embodiments of the invention may utilize any level of indirection and the non-lookup values shown in the main data table of FIG. 1 versus the lookup values shown in the data attribute table of FIG. 2 are exemplary and are shown in this manner for ease of illustration. One skilled in the art will readily recognize that non-lookup values may be implemented one level of indirection lower as well as adding a second level of indirection to the lookup and multi-value lookup fields.

Figure 7:
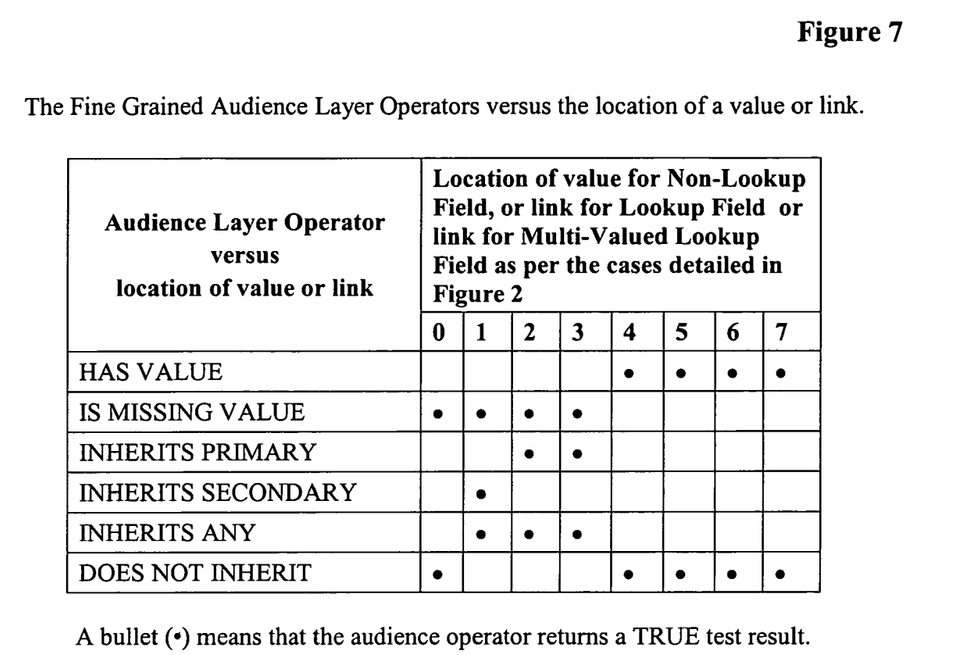
FIG. 7 illustrates the Fine Grained Audience Layer Operators versus the location of a value or link.

To deal with the different cases of data locations with audience inheritance as shown in FIG. 6, the system may utilize audience layer operators that allow for searching for data or the existence of data with fine grained granularity in specified layers at shown in FIG. 7. For non-lookup fields, the audience layer operator used in a search returns TRUE for fields that have a non-null value. For lookup fields, the audience layer operator used in a search returns TRUE for fields that have a link to a given lookup value. For multi-value lookup fields, the audience layer operator used in a search returns TRUE for fields that have at least one link to a given lookup value. In multi-audience data sets, searching for the existence of data using the coarse grained "IS NULL" operator returns non-lookup fields that have all associated audience inheritance levels set to NULL or lookup fields that do not link to a sub-table. The fine grained "HAS VALUE" operator checks for missing data in the current audience layer only as opposed to checking in all layers as the coarse grained "IS NULL" operator does. Other predefined audience layer operators may also be used for fine grain searching such as "HAS VALUE", "IS MISSING VALUE", "INHERITS PRIMARY", "INHERITS SECONDARY", "INHERITS ANY", "DOES NOT INHERIT".

The "HAS VALUE" and "IS MISSING VALUE" operators provide complementary functions used to determine if the current audience layer comprises a value or link or whether the converse is true. This corresponds to the current layer column of FIG. 6. The "INHERITS PRIMARY" operator returns TRUE when the current audience layer inherits a value or link from the primary inheritance layer but not from the secondary inheritance layer or current layer and corresponds to rows 2 and 3 of FIG. 6. The "INHERITS SECONDARY" operator returns TRUE when the current audience layer inherits a value or link from the secondary inheritance layer but not from the primary inheritance layer or current layer and corresponds to row 1 of FIG. 6. The "INHERITS ANY" operator returns TRUE when the current audience layer inherits a value or link from either the primary or secondary audience layer. The "DOES NOT INHERIT" operator returns TRUE when the current audience layer does not inherit a value or link which corresponds to finding the value or link in the current audience or not finding any value at all in which to inherit from and this corresponds to rows 0, 4, 5, 6 and 7 of FIG. 6. Other embodiments of the invention may return the actual value or link for a positive result and a null reference for a negative result.

Figure 8:
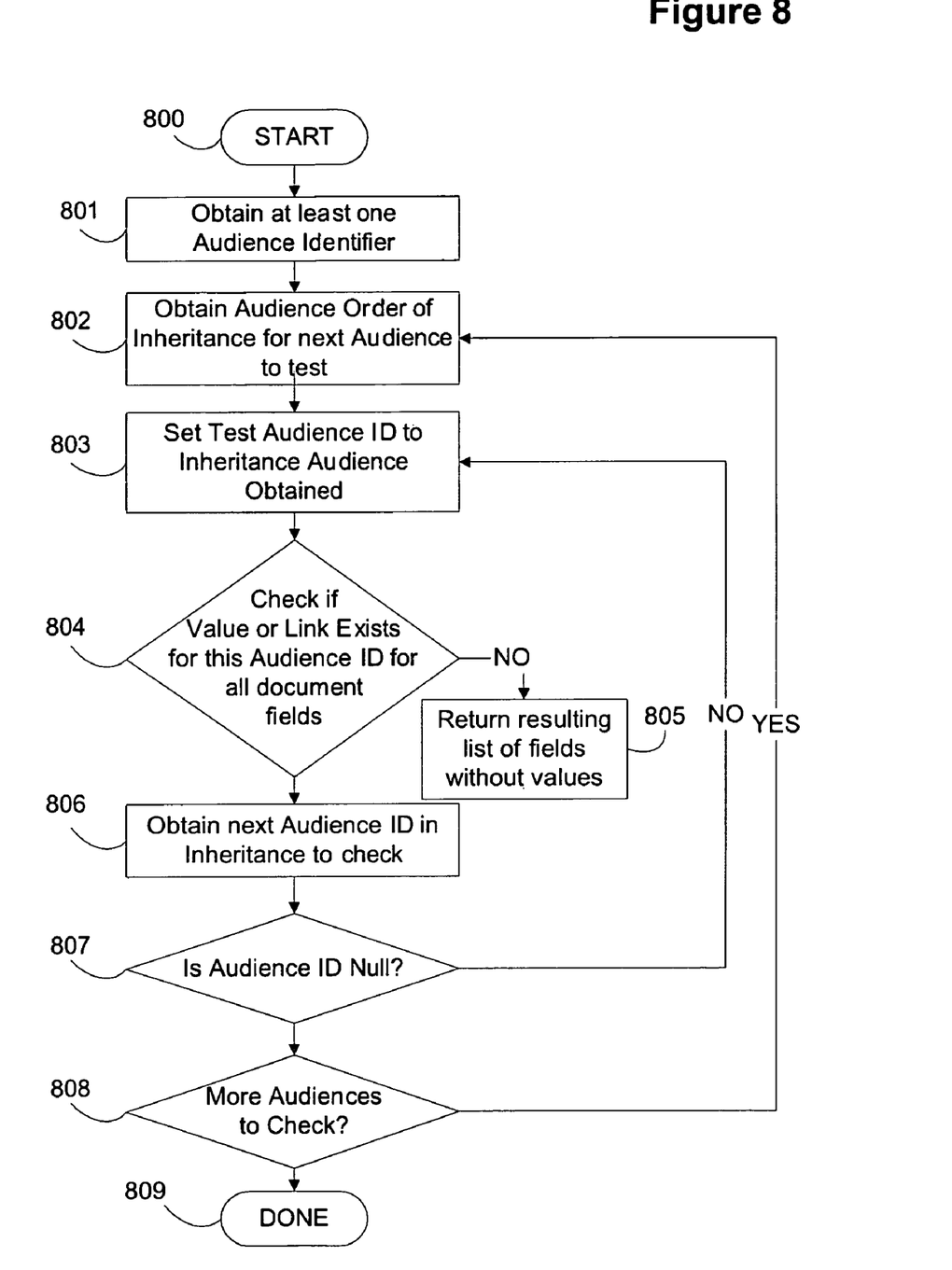
FIG. 8 illustrates an embodiment of a search method utilizing a coarse grained operator IS NULL operator on a multi-audience data set.

A method for coarse grain searching using an embodiment of the invention is shown in FIG. 8. The process starts at 800 and in this Figure the "IS NULL" coarse grained operator is utilized in the search. The "IS NOT NULL" operator uses an identical process but returns the fields/lookups that are not Null where this figure returns the fields/lookups that are Null. Searching using the "IS NULL" operator on a multi-audience data set is performed with respect to a list of "audience identifiers" that is obtained at 801. As previously detailed, an audience identifier specifies the hierarchy of audiences to check for values and this hierarchy is obtained at 802 as per FIG. 3. The audience test identifier to use to test for the existence of a value or lookup link is set at 803 to the first audience identifier obtained at 802. If no value or link exists for this test audience identifier and the fields that make up an audience layered document at 804, then the "IS NULL" operator returns the list of fields having Null values at 805. The next audience identifier listed in the audience order of inheritance for this audience is obtained at 806. If the next audience identifier is null at 807 then the "IS NULL" operator returns checks to see if there are more audiences to check at 808. If the next audience identifier is not null meaning that there is another audience in the hierarchy to utilize, then processing continues at 803. This process continues for all audience identifiers specified and completes at 809. This testing for the existence of a value is coarse grained since there is no control over the layer in which the value or link is to be searched in.

Figure 9:
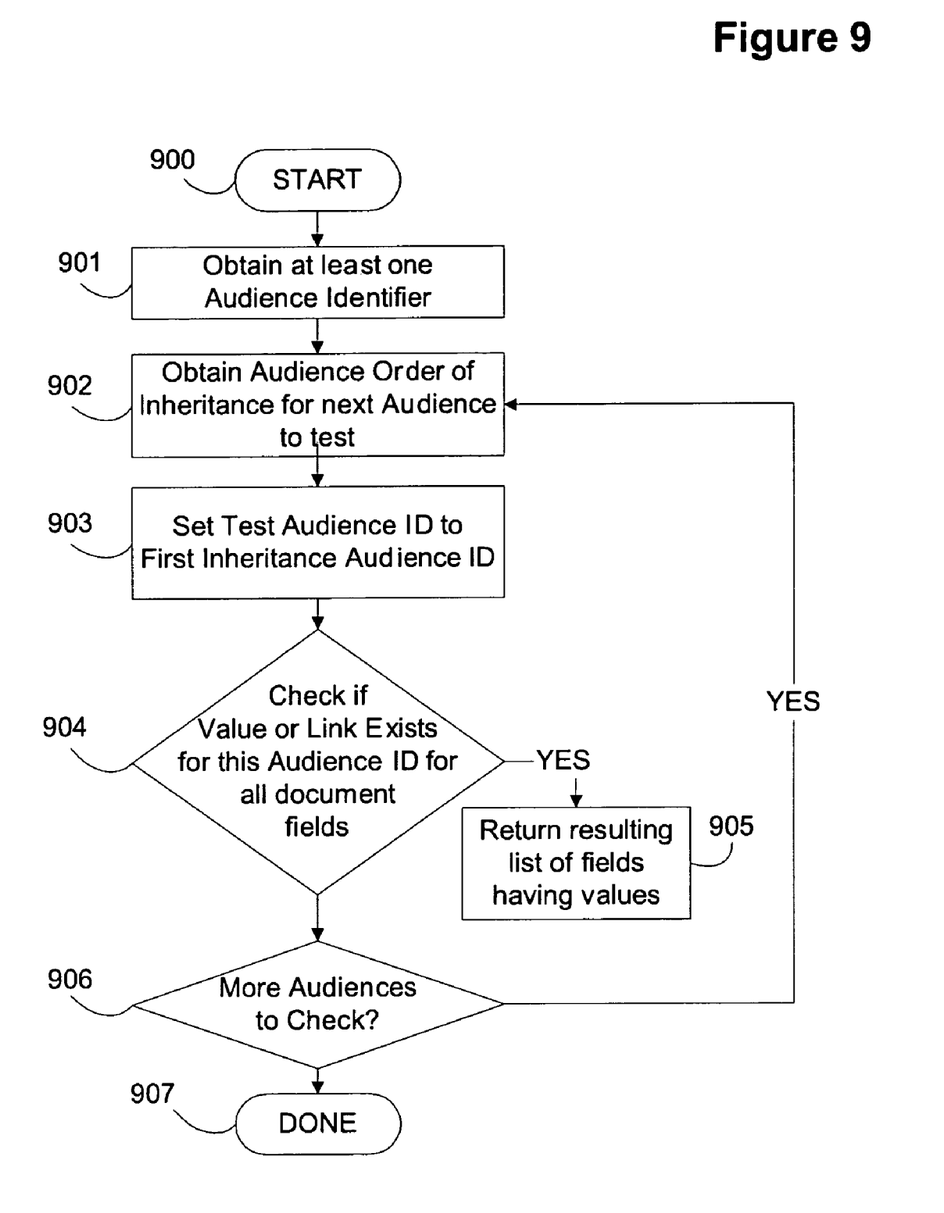
FIG. 9 illustrates an embodiment of a search method utilizing a fine grained operator "HAS VALUE" on a multi-audience data set.

A method for fine grain searching using an embodiment of the invention is shown in FIG. 9. For the fine grained operator "HAS VALUE" the process starts at 900, at least one audience identifier is obtained at 901. The audience order of inheritance list is obtained at 902 for the first audience identifier selected from the set of audience order identifiers specified at 901. The test audience identifier is set to the first audience ID found in the audience order of inheritance list at 903. The document is checked for all fields that have a value or link in their field at 904. If the value or link exists for the fields of the document, then those field that have a value are returned at 905. If there are more audiences to check as determined at 906, then processing continues at 902. Otherwise, processing completes at 907. Normally, testing on an audience specific document for missing values is performed by quality assurance personnel and this test is performed using the "IS MISSING VALUE" operator. The "IS MISSING VALUE" operator returns the fields or lookups that are missing values instead of the fields or lookups that have values, so the test at 904 is reversed in this case. See FIG. 7 showing that "AS VALUE" is the complement of "IS MISSING VALUE".

Figure 10:
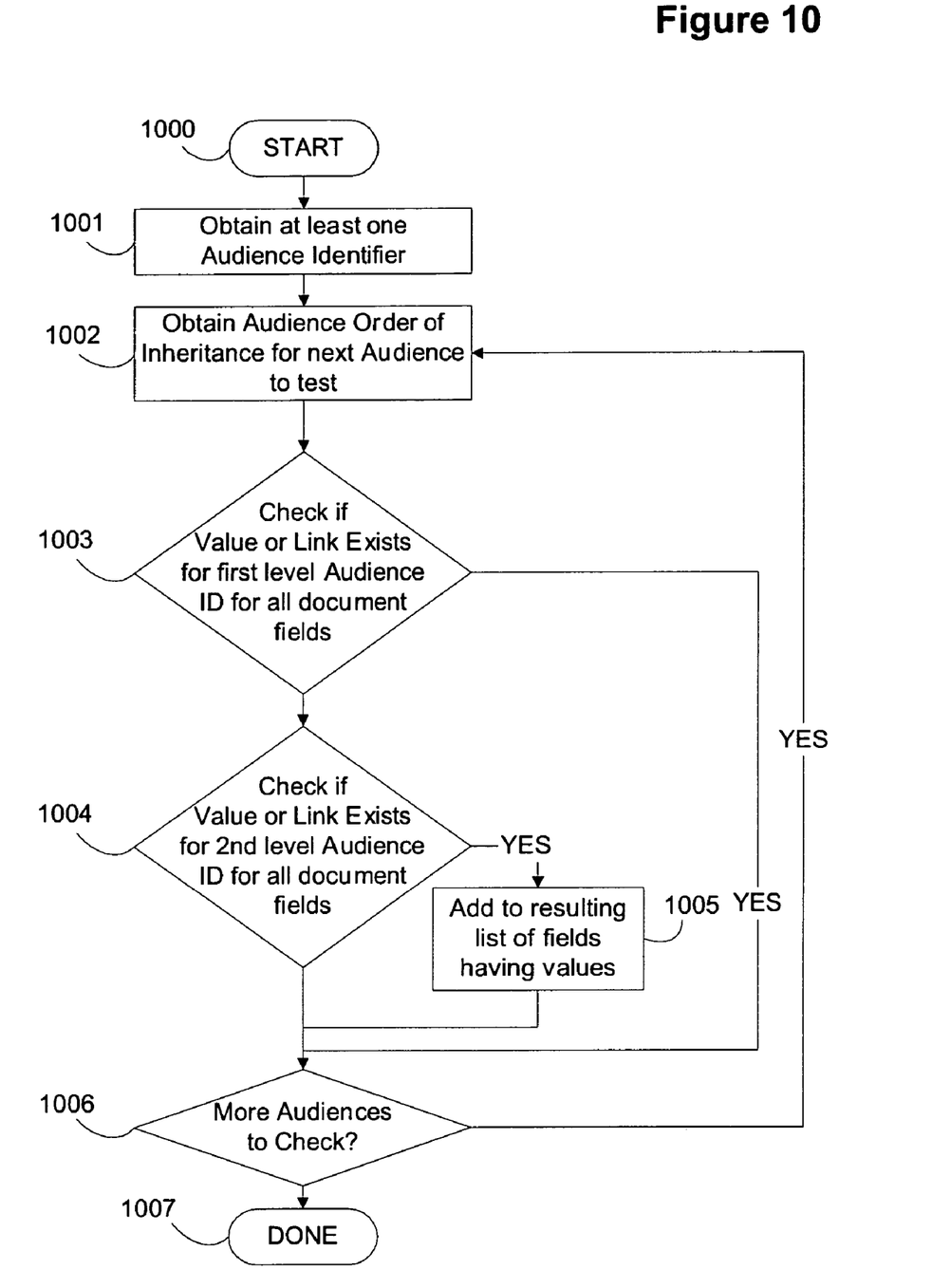
FIG. 10 illustrates an embodiment of a search method utilizing a fine grained operator "INHERITS PRIMARY" on a multi-audience data set.

For the fine grained operator "INHERITS PRIMARY", the process starts at 1000 and at least one audience identifier is obtained at 1001. The audience order of inheritance set is obtained at 1002. The first audience identifier in the audience order of inheritance is used with the desired field in order to check if a value of field exists for this first level of inheritance at 1003 (i.e., the value is not inherited from another layer). If there is a value in a field with respect to the audience identifier at the top level of the inheritance chain, then the field is not added to the resulting list of fields using primary inheritance, since the top audience level is being used for a given field with respect to the current audience identifier. If the value or link exists for the second audience identifier obtained from the audience order of inheritance at 1005, then the operator result returned is added to the resulting list of fields having values for the primary inheritance level at 1005. If the value or link for a field does not exist for the second audience identifier then the operator result is not added to the resulting list of fields having values at the primary inheritance level. Processing includes checking for more audiences to check at 1006 and completes when there are no more audiences to check at 1007.

The result set returned from a coarse grained and/or fine grained operator search may be presented to the user in a variety of ways. For testing multiple layers, a list of search results per audience layer may be presented to the user in list form, or tabular form or in any other method that allows the user to view the results of the search. Any method of visually presenting the results of a search on one or more audience identifiers is in keeping with the spirit of the invention.

While the invention herein disclosed has been described by means of specific embodiments and applications thereof, numerous modifications and variations could be made thereto by those skilled in the art without departing from the scope of the invention set forth in the claims.

What is claimed is:

1. A method for searching layered data in a computer database used for generating an audience layered document to test said document generation comprising:
   obtaining at least one audience identifier associated with an audience-specific layer of layered data stored in a computer database;
   obtaining at least one data identifier associated with a field in at least one layer of said layered data;
   obtaining a first audience inheritance list for a first audience identifier selected from said at least one audience identifier, wherein said first audience inheritance list comprises information on inherited audiences for an audience identified by said first audience identifier;
   accepting an operator;
   checking for a first value in a plurality of fields associated with said computer database using said first audience inheritance list based on said operator, wherein said first value is associated with said at least one data identifier and said audience identifier;
   obtaining a second audience inheritance list for a second audience identifier selected from said at least one audience identifier, wherein said second audience inheritance list comprises information on inherited audiences for an audience identified by said second audience identifier;
   checking for a second value in a plurality of fields associated with said computer database using said second audience inheritance list based on said operator, wherein said second value is associated with said at least one data identifier and said second audience identifier;
   returning a result for a search based on said checking.

2. The method of claim 1 wherein said operator is a coarse grained operator.

3. The method of claim 1 wherein said operator is a fine grained operator.

4. The method of claim 1 further comprising presenting said result to a user.

5. The method of claim 1 wherein at least one of said first value and said second value comprises a link to at least one field associated with said at least one data identifier and at least one of said first audience identifier and said second audience identifier.

6. A computer system for searching hierarchically layered audience specific data in a computer database used for generating an audience layered document to test said document generation comprising:
   a computer system configured to:
      obtain at least one audience identifier associated with an audience-specific layer of layered data stored in a computer database;
      obtain at least one data identifier associated with a field in at least one layer of said layered data;
      obtain a first audience inheritance list for a first audience identifier selected from said at least one audience identifier, wherein said first audience inheritance list comprises information on inherited audiences for an audience indentified by said first audience identifier;

select an operator;

search for data in fields associated with said computer database for said first audience inheritance list and said at least one data identifier related to said operator;

obtain a second audience inheritance list for a second audience identifier selected from said at least one audience identifier, wherein said second audience inheritance list comprises information on inherited audiences for an audience indentified by said second audience identifier;

search for data in fields associated with said computer database for said second audience inheritance list and said at least one data identifier related to said operator; and, return a result of said search.

7. The computer system of claim 6 wherein said operator is a coarse grained operator.

8. The computer system of claim 6 wherein said operator is a fine grained operator.

* * * * *

UNITED STATES PATENT AND TRADEMARK OFFICE
CERTIFICATE OF CORRECTION

| | | |
|---|---|---|
| PATENT NO. | : 7,647,302 B2 | Page 1 of 1 |
| APPLICATION NO. | : 11/217068 | |
| DATED | : January 12, 2010 | |
| INVENTOR(S) | : Endo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 269 days.

Signed and Sealed this

Sixteenth Day of November, 2010

David J. Kappos
*Director of the United States Patent and Trademark Office*